United States Patent Office 2,865,875
Patented Dec. 23, 1958

2,865,875

LOW ASH PHENOL-FORMALDEHYDE RESINS AND PROCESS OF PREPARATION

Joseph B. Hyman, Plainfield, and William R. Sterr, South Plainfield, N. J., assignors to Catalin Corporation of America, a corporation of Delaware No Drawing. Application March 5, 1956
Serial No. 569,234

12 Claims. (Cl. 260—29.3)

Many descriptions of methods of making phenol-formaldehyde resins using an alkaline catalyst make no distinction between the use of a fixed alkali metal catalyst such as caustic soda and a volatile nitrogen-containing catalyst such as ammonia. Actually it is well recognized that the reaction mechanisms through which these two types of catalysts function are distinctly different. Broadly one may say that the ammonia type catalyst promotes a first order reaction, whereas the fixed alkali catalysts promote second order reactions. These result in differences in structure in the end products. See for example Ind. and Eng. Chem., vol. 44, p. 354 (1952), and J. App. Sc., vol. 1, p. 257 (1951). There is no doubt but that these two types of catalyst act differently and produce resinous products having distinctly different characteristics.

One of the important differences between the effect of the two types of catalysts has to do with the amount of formaldehyde that can be combined with each mol of phenol. With the fixed alkali catalyst, up to about 3 mols of formaldehyde can be combined with each mol of phenol, whereas with the ammonia type catalyst it is very difficult to combine more than 1.5 mols of formaldehyde for each mol of phenol. This difference affects the economies of the process because formaldehyde is considerably less expensive than phenol. It is also the fact that the fixed alkali catalyzed resin ordinarily has greater water tolerance than the ammonia type. A further advantage is that with the fixed alkali, solutions can be made having a much higher percentage of solids for a given viscosity.

The drawback to the use of the fixed alkali catalyst is that the presence of the fixed alkali in the final resin is frequently objectionable. Heretofore there has been no practicable way of completely removing such alkali while still maintaining a reactive resin with reasonable shelf life, that is, a resin solution which will remain water-soluble without precipitation or gelation for a reasonable length of time. So-called "filtered resins" have been produced by reacting the phenol and formaldehyde with a fixed alkali and then after condensation has occurred, adding a precipitating acid such as phosphoric or oxalic. A substantial part of the free alkali is thereby precipitated and can be filtered out. However, there are always residual traces of the salt formed which are left behind in the resin and the percentage of such residual salt is high enough to affect the quality of the product. The difficulties that arise from trying to make and use fixed alkali resins for certain types of laminating purposes is well brought out in Kline Patent No. 2,151,975 of March 28, 1939 (p. 2, col. 2, line 54 et seq.).

According to the present invention, we carry out the original condensation in the conventional manner with the fixed alkali catalyst and then remove the catalyst in whole or in part by the use of an ion exchanger. We have found that if all of the alkali is removed, the resin will quite quickly lose its water solubility and will be slow to set up in its final application, and it is an essential feature of our invention that after the alkali is removed by the ion exchanger the pH is adjusted to a value of between 4 and 8. Such adjustment can be accomplished either by limiting the extent that the resin is exposed to the ion exchanger, or the pH may be brought below 4 in the ion exchange column and then built up again by the addition of a selected alkali. This gives the possibility for standardization and control of the products and also for the production of definitely new products.

When an alkali is to be added to the resin after the ion exchange treatment, this may be either of the same type of alkali as was originally used (i. e. a fixed alkali) or a volatile alkali may be employed. Where the adjustment is carried out with a fixed alkali, one may use a simple alkali solution for the adjustment or the adjustment may be made by blending with a portion of resin having a pH above the desired figure, as for example resin which has not been treated in the ion exchanger.

In place of the fixed alkali, for certain purposes it is desirable to use a nitrogen-containing alkali such as ammonia or an amine. Any type of amine can be used for this purpose but considerations of color and odor and the like may limit the selection. It is also true in this case, as in the previous art where amines were used as original catalysts, that the nature of the final product will vary somewhat with the amine employed. For example, if ammonia is used for making the adjustment, it will tend to condense with any free formaldehyde present and this will tend to lower the water tolerance of the resin. Accordingly when water tolerance is important, a less reactive volatile nitrogen-containing alkali will ordinarily be selected. For many purposes, it is important to use an amine which will be volatilized off during the final cure of the resin. Amines useful for adjusting the pH include monomethylamine, monoethylamine, isopropylamine, diethylenetriamine and trimethylamine. Where volatility is not important, amines such as triethanolamine may be used. Other amines are also referred to in the examples given below.

When ammonia or one of the amines is used for adjusting the pH it usually will be desirable to eliminate substantially all of the fixed alkali by the ion exchanger so that the ash content will be brought down to a very low level, certainly as low as .02% and usually even lower, depending upon the presence of impurities in the reagents. This means that the pH will usually be 3 or lower.

When ammonia or amines are used for adjusting the pH of a resin which was originally catalyzed with a fixed alkali and made with at least 1.5 mols of formaldehyde for each mol of phenol, a new type of material is produced. The resin will have the structure characteristic of the high formaldehyde, fixed alkali catalyzed resins and will have a better water tolerance than the usual ammonia catalyzed resin. Ordinarily this water tolerance will be at least 100% when the resin is freshly made. Also the resin will be characterized by its low viscosity for a high solids content. For example, it is generally recognized that with a resin catalyzed by ammonia or an amine, it is very difficult to produce a resin having 70% solids and a viscosity below about 4 to 5 poises. On the other hand, using our new process, resins can be produced with the pH adjusted with an amine, having a solids content of 70% and a viscosity of below 3½ poises. In fact, using this new process, virtually ash-free resins can be produced without difficulty which remain liquid in water solution with a solids content up to 80%.

If the adjustment to the desired pH requires the addition of alkali, the adjustment should be made without undue delay (say within about 24 hours) for if the resin once loses its water solubility, such solubility can only be partially restored by subsequent addition of alkali.

The relative proportions of phenol and formaldehyde used in our process are not critical but below a proportion of about 1.5 mols of formaldehyde to each mol of phenol there is but little benefit had from using the double treatment and for many purposes it would be simpler to use the volatile catalyst from the beginning. At the high end only about 3 mols of formaldehyde can be combined with each mol of phenol. Accordingly for practical reasons we limit our process to one in which between 1.5 and 3.2 mols of formaldehyde are used for each mol of phenol. From a commercial point of view it usually will be found desirable to use between 1.7 and 3 mols of formaldehyde for each mol of phenol.

Generally speaking, when the final adjustment of pH is made using a fixed alkali, resins are obtained which will be particularly characterized by their water solubility. With this type of catalyst, resins can be obtained having a water tolerance within the range of 150% to 3000% or even higher for a resin having up to as much as 85% solids content and this resin will have a substantial life against premature gelling or precipitation.

When using the term "water tolerance" we mean the relative amount of water that will cause clouding. The user just has to mix a given amount of the resin solution with water and note the number of volumes of water required to cause the first appearance of clouding. For example, if 30 parts of water are required to form a cloud in 10 parts of say a 35% solution of the resin, it is said that such solution shows a water tolerance of 300%.

Even though resins of this type (where the pH is adjusted with the fixed alkali) will contain small amounts of residual fixed alkali, this alkali is presumably reacted with the phenol and appears as a phenolate. It is not present as a separate salt and therefore even in this case a low alkali resin is obtained which is free of the fixed salt of any acid other than phenol or of such very small amount of formic acid which may originate from the formaldehyde amounting to not over about .01%. This is so small a percentage that we term the resin "substantially free of the fixed alkali salt of any acid other than phenol."

Resins of this nature are valuable, for example, as binders in rock wool and glass fiber insulation. Excessive proportions of ash in resin solutions for such use lead to undesired absorption of water by the binder in the bonded glass or rock wool batts with injurious results. Using our process the material having a pH range of from 4 to 8 ordinarily will show an ash content of between .05 and .9% where the adjustment is made with the fixed metal alkali.

When the volatile nitrogen type alkali is used for the final adjustment the product will have sufficient solubility so that it can be preserved either in water, or aqueous alcohol solutions as is customary with ammonia catalyzed liquid resins, but these resins will be cheaper to produce and the high percentage of solids in the solution may be substantially above that which can be had with the usual ammonia catalyzed product. These resins, due to their very low ash content, are valuable for many laminating purposes particularly in making so-called electrical grade laminates. As with the usual ammonia catalyzed materials, when these resins are finally cured the nitrogen alkali will volatilize and be driven off.

As to the conditions of operation, the preliminary reaction is conventional. The phenol employed (which term is meant to include homologues of phenol) is combined with the formaldehyde (usually as a 37% to 50% solution) and the alkali catalyst is added. Ordinarily the catalyst will be sodium hydroxide though potassium, barium or lithium hydroxide may be used for certain purposes. The amount employed, as usual, will be from 5 to 120 parts of alkali per 1000 parts of phenol. In the conventional way the aqueous mixture is heated until the reaction starts, and the reaction is continued until the content of free formaldehyde ceases to fall rapidly. At this stage the free formaldehyde content should not exceed about 8% and preferably should be even lower, say not over 5%. This preliminary condensation is carried on to the point customary in making so-called liquid resins and may be modified within reasonable ranges depending upon the use to which the final product is put as is known to those skilled in this art. Examples of representative times and temperatures for the condensation are as follows:

5.5 hours at a reaction temperature of 60° C.
2.5 hours at 70° C.
1.5 hours at 80° C.

The resin solution is suitably cooled to slow up reaction and then is brought in contact with the cation exchanger, usually at a temperature of from 20° C. to 80° C. The ion exchange operation may be carried out as a batch operation but ordinarily the resin will be passed through a mass of the cation exchanger.

The extent of treatment with the cation exchanger will depend upon the nature of the final product as has already been indicated. The treatment may be such that virtually all of the original catalyst is removed or the treatment may be so controlled and adjusted that the treated product has the desired pH. In any event, the resin is adjusted (either by such control or by carrying the pH below 4 with subsequent addition of alkali) to a pH of between 4 and 8. For example, the effluent from the ion exchange column that is first passed through the mass may have a pH below 4 and later as the effectiveness of the ion exchange medium lessens, the pH may be found to be higher. In such case the pH of that portion of the solution which is too low can be adjusted by blending, using portions of the resin that have sufficient alkali so that their pH is above 8, or if desired the adjustment may be made with a simple solution of the desired alkali.

The ion exchanger used is one that has cation retention properties so that equilibrium permits substantially complete removal of the cation of the alkali used in the original condensation. Examples of such cation exchangers illustrating the class that may be used after adjustment to the hydrogen or acid cycle are Nalcite HCR, sulfonated styrene divinyl benzene product; Dowex 50, nuclear sulfonic acid; Amberlite IR 120 nuclear sulfonic acid Dowex 30; phenolic methylene sulfonic acid; Zeo Karb, sulfonated coal; and Amberlite IR 105, phenolic methylene sulfonic acid. (R. Kunin and R. J. Myers, "Ion Exchange Resins," pp. 58–59 (1950), J. Wiley & Sons.)

This invention may readily be understood from the following examples:

A. *Examples in which the pH is adjusted using a soluble metal alkali.*—In these examples the ratio of phenol to formaldehyde was in the range of 1 mol of phenol to between 2 and 3.2 mols of formaldehyde and the pH was preferably adjusted to fall in the range of from 4.8 to 7.8 and the material showed an ash of between .05% and .9%. The free formaldehyde in the product was between 4% and 8%. These values represent preferred commercial ranges.

EXAMPLE NO. 1

*Batch process.*—1000 parts of phenol and 1700 parts of formaldehyde in 37% solution (mol ratio approximately 1:2) were condensed by warming with 30 parts of sodium hydroxide at 70° C. for 2 hours and 25 minutes. After cooling to 50° C. 200 parts of ion exchange resin Amberlite IRC 50 was added to the batch and the whole mixture concentrated by evaporation in vacuo to a specific gravity of 1.235. The product at pH 7.22 was then filtered to remove the Amberlite and leave the treated condensation product in the filtrate.

The product after cooling had the following physical properties: viscosity at 25° C., 3.3 poises specific gravity at 25° C., 1,234; water tolerance, 1600%; total solids 70.1%; and total ash residue (on ignition) 0.149%. The ash is essentially sodium carbonate.

EXAMPLE NO. 2

*Continuous process.*—1000 parts of phenol, 1855 parts of formaldehyde (methanol free, 37%) and 30 parts of sodium hydroxide dry weight were condensed by warming at 70° for 2½ hours and then cooled immediately to 40° C. The resulting resin solution was percolated slowly through a column of Amberlite IRC–50, of depth about 2.5 feet and of weight approximately 250 parts, at such a rate as to produce a pH of 7.1 to 7.8 in the effluent. Any portion of the effluent of pH above 7.8 was rejected and set aside for processing in the next cycle. The effluent of pH 7.1 to 7.8 was then concentrated by evaporation in vacuo, to a solution of resin solids content approximately 80%. The water tolerance was 1000% to 2000%. The ash content was 0.3% on the weight of the final resin product.

EAMPLE NO. 3

*Other exchangers.*—The procedure of Examples 1 or 2 is followed with the substitution of the Amberlite IRC–50 by any other cation exchangers listed above on an equal weight basis.

EXAMPLE NO. 4

*Adjustment by blending.*—1000 parts phenol, 1855 parts of formaldehyde (methanol-free, 37%) and 30 parts of sodium hydroxide (dry weight) were condensed by warming at 70° C. for 2½ hours and then cooled a little to 40° C. The resulting resin solution was percolated slowly through a column of Nalcite HCR of depth about 2½ ft. and of weight approximately 500 parts. The initial effluent had a pH of 3.5 to 4.8 and remained fairly constant until the ion exchange bed neared exhaustion. The pH then rose rapidly to a value of 8.1 to 8.5. The resin percolation through the column was continued until the total of combined and blended effluent reached a pH of 7.1 to 7.8. At this point no further resin was percolated through the column. The effluent was then concentrated by evaporation in vacuo to a solution of resin solids content approximately 70%.

The water tolerance of the product was 1000% to 2000% and the ash content 0.3% on the weight of the final resin product, the ash percentages here and elsewhere being calculated to the dry basis unless noted to the contrary.

Continuing the passage of the resin solution through the exchanger after the exchanger was substantially spent raised the pH of the combined and blended effluent to bring the entire blended lot into the specified range for the desired water tolerance.

EXAMPLE NO. 5

*Phenol with o-cresol.*—The procedure of any of the Examples 1 to 4 above is followed with the exception that the phenol there used is replaced by "natural" phenol containing 10 to 40 parts of cresol for 100 of mixed phenol and cresol. The water tolerance of this condensation product, finished as described above, is at least 1½ volumes of water to 1 volume of the 35% solution of the condensation product.

EXAMPLE NO. 6

*Adjustment with alkali solution.*—In this example the procedure of Example 4 was followed but the effluent from the column that had a pH below about 4.8 was separated and adjusted by the addition of a solution of NaOH until its pH fell between 4.8 and 7.8. The percolation was stopped when the pH of the effluent rose above about 7.8.

B. *Examples in which the pH is adjusted using a nitrogen-containing base.*—In these examples the ratio of phenol to formaldehyde was in the range of 1 mol of phenol to between 1.7 and 3.2 mols of formaldehyde and since a substantial absence of metal alkali was desired, the ion exchanger was employed in an amount to bring the pH down to at least as low as 3 and to bring the ash of the solution down to at least as low as .02%. Since this ash also may include impurities that may be present, this low level indicates that substantially all the metal alkali is removed. Even though the formaldehyde used was in the ratio of more than 1.5 to 1, the free formaldehyde was below 8% and usually was kept below 5%. The pH was adjusted to between 4 and 8. In this way we obtained a resin with a pH of between 4 and 8 alkalyzed with a nitrogen-containing base and containing at least 1.7 mols of formaldehyde in combination but substantially free of ash and with a very low free formaldehyde content.

EXAMPLE NO. 7

*Ammonia.*—2242 grams of 37.1% formaldehyde (methanol content 1%) were reacted with 1000 grams of phenol (synthetic, M. P. 40.3° C.), the molar ratio of phenol to formaldehyde being 1:2.60, at 70° C. for 2 hours using 60 grams of 100% sodium hydroxide as catalyst. The reaction solution was then cooled to 25° to 30° C. and contacted in a column with 424 grams (dry basis) of Nalcite HCR resin previously converted to the hydrogen cycle, the flow being so regulated as to obtain a pH of 2.4 to 2.7 in the effluent. The effluent was then adjusted to a pH of about 6 by the addition of 28% ammonia. The solution was concentrated by evaporation to a weight of 1830 per 1000 parts of phenol. 300 parts by weight of ethanol/1000 phenol were then added.

The resulting resin solution had the following analysis:

| | |
|---|---|
| A. S. T. M. solids content_____percent__ | 70.1 |
| Viscosity at 25° C., poises_____ | 2.92 |
| Specific gravity at 25° C_____ | 1.198 |
| pH _____ | 5.88 |
| Water tolerance _____percent__ | 160 |
| Free formaldehyde _____do____ | 5 |
| Setting time at 135° C_____sec__ | 560 |
| Ash_____percent__ Less than | 0.005 |

This resin solution was used to impregnate Hurlbut 10 mil alpha cellulose No. 521 paper to a resin content of 50%, a volatile content of 2.5%, and greenness of 3.6%. The impregnated paper was consolidated into a laminated board at 320° F. and under a pressure of 1000 p. s. i. The length of the pressing cycle was dependent on the thickness of the board desired; for a ½ inch board 60 minutes were used, while for a ⅛ inch board 40 minutes were used. The laminated boards prepared in this manner had the following characteristics:

*Water absorption*

ASTM water absorption (on 0.107" laminate) _____percent__ 0.60
ASTM hardness (Rockwell, M scale at 25° C.)____ 116

*Electrical rating*

| | As Made | After 24 hr. Soak in Water at 25° C. |
|---|---|---|
| Power factor, $10^6$ cycles_____ | 0.0567 | 0.0582 |
| Dielectric constant, $10^6$ cycles_____ | 5.65 | 5.85 |
| Loss factor_____ | 0.320 | 0.340 |

*Flexural test*

| | Flatwise | Edgewise |
|---|---|---|
| Flexural strength, p. s. i_____ | 13,560 | 11,950 |
| Deflection at rupture, inches_____ | 0.08 | 0.05 |
| Elastic modulus, p. s. i. $\times 10^5$_____ | 10.8 | 10.3 |

Tensile test

| | | |
|---|---|---|
| Tensile strength | p. s. i. | 11,580 |
| Elongation | inches | 0.011 |
| Elastic modulus | p. s. i. $\times 10^5$ | 13.23 |

This showed that we had made a very good electrical grade varnish initially catalyzed with a fixed metal alkali and using 2.6 mols of formaldehyde for each mol of phenol.

EXAMPLE NO. 8

*Cresylic acid resin.*—1450 grams of 37% formaldehyde (methanol content 1%) were reacted with 500 grams of phenol (synthetic, M. P. 40.3° C.) and 500 grams of a commercial cresylic acid blend (B. P. range of approximately 200° to 220° C. and consisting of about 67% meta and para cresol, 11% low xylenols, 17% 3,5 xylenols, and 5% higher boiling phenols). The molar ratio of the phenolic constituents to formaldehyde was about 1:1.9, the mol weight of the cresylic acid used being considered as 122. The reaction was carried out at 70° C. for a period of 80 minutes in the presence of 40 grams of 100% sodium hydroxide. The above reaction product was cooled to 25° to 30° C. and passed through a column containing 286 grams of dry Amberlite IR 120 resin in the hydrogen cycle. The rate of flow through the column was so regulated as to yield an effluent having a pH of 2.5. The pH of the deionized condensation product was adjusted to pH 5 by the addition of 28% ammonia. The condensation product was then concentrated to a solids content of approximately 80% by vacuum dehydration and subsequently reduced to 70% by dilution with 95% ethanol.

The resultant resin solution was used to impregnate the 10 mil alpha cellulose paper described in Example 1 to a resin content of 50% to 55%. The impregnated paper was consolidated into a laminated board having a thickness of 1/8 inch at a pressure 1000 p. s. i. applied for 40 minutes at 320° F. The laminated board had a dielectric constant of 5.21 measured at 1 megacycle. These results again showed that we had produced a satisfactory electrical grade varnish.

EXAMPLE NO. 9

*Ethylamine.*—1470 grams of 37% formaldehyde (methanol content 7%) were reacted with 1000 grams of natural phenol (90% phenol, approximately 8% cresol, M. P. 38.5° C., boiling range 177° to 182° C.), the molar ratio of the phenol to formaldehyde being about 1:1.7. The reaction was carried out at reflux temperature (100° C.) for a period of 30 minutes in the presence of 7 grams of 100% potassium hydroxide. The condensation product was cooled to 25° to 30° C. and 37.6 grams of dry Dowex 50 cation exchange resin was added. Agitation was continued for a period of 30 minutes after which time the ion exchange resin was removed by filtration. The deionized condensation product was adjusted from a pH of 2.6 up to 6.3 by the addition of ethylamine and was concentrated by vacuum dehydration to a solids content of 80%. The concentrated product was then diluted to a solids content of 70% with 95% ethanol.

EXAMPLE NO. 10

*Ion exchange after dehydration.*—1350 grams of 37% formaldehyde (methanol content 1%) were reacted with 800 grams of synthetic phenol (M. P. 40.3° C.) and 200 grams of octyl phenol, the molar ratio of phenolic constituents to formaldehyde being 1:1.7. The reaction was carried out at reflux temperature (approximate 100° C.) for a period of 50 minutes in the presence of 20 grams of 100% sodium hydroxide. The condensation product was dehydrated under vacuum to a solids content of 85%. The dehydrated product was diluted to a solids content of 60% with ethyl alcohol (95%). The diluted product was cooled to 25° to 30° C. and passed through a column containing 142 grams of dry Nalcite HCR resin in the hydrogen form, the pH of the effluent being less than 3. The pH of the solution was adjusted to 4.5 by the addition of isopropyl amine.

EXAMPLE NO. 11

*Ash-free water soluble resin.*—1000 grams of synthetic phenol (melting point 40.6° C.), 1295 grams of 37.1% formaldehyde (containing 1% methanol) and 140 grams of 25% sodium hydroxide were allowed to react at 70° C. for two hours. The reaction mixture was quickly cooled to 35° C. and passed through a column of Nalcite HCR until the pH fell to about 3 and the ash was not over .02%. The effluent at this low pH was neutralized with triethanolamine to a pH of 5.5 and then dehydrated to a solids content of 70% as measured by ASTM Method D-115-48T. This resin was virtually ash-free and was characterized by its excellent water solubility and the fact that even with 70% solids its viscosity did not exceed 3 poises. It cured to a light color and very low pH.

EXAMPLE NO. 12

The procedure of Examples 7 to 11 is followed except that there is substituted, for the phenol used, the alkali catalyst used for the original condensation, or the cation exchanger, respectively, any of the other phenols alone or mixed with phenol, or other fixed alkalies disclosed herein, both on an equimolar basis, or any of the other cation exchangers.

For 100 parts of total solids in the solutions produced as described herein and also in Examples 7 to 11, the proportion of unreacted formaldehyde was less than 8 parts and the ash (the remainder of the fixed alkali catalyst plus any ash-forming impurities) less than 0.02 part.

C. The following examples illustrate special products where particular materials are included in the phenol-formaldehyde reaction mass in order to obtain special results.

EXAMPLE NO. 13

*Resin containing an amine hydrochloride.*—1000 grams synthetic phenol (melting point 40.6° C.) 2200 grams of 37.1% formaldehyde and 240 grams, 25% sodium hydroxide were allowed to react for 1 hour and 45 minutes at 70° C. The reactants were then cooled quickly to 35° C. and contacted with an excess of Nalcite HCR to remove the sodium hydroxide completely. To the effluent 60 grams of 100% triethanolamine (as 25% solution) were added and thoroughly mixed. Then 10 grams of 100% hydrochloric acid were added as 20% solution. The effluent so treated was then dehydrated to a solids content of 60%. The pH of the final product was in the range of 7.4 to 7.7. This resin contained no salt of a fixed alkali but the amine hydrochloride in the resin is valuable because it is capable of neutralizing free alkali from material such as glass fiber when it is used for making mass insulation.

EXAMPLE NO. 14

*Resin containing an amine salt.*—The procedure and formulation were the same as in Example 13 except the amine used was triethanolamine (used in the same molecular proportion as the amine of Example 13) and the acid used was chloroacetic acid. In this case the resin contained a salt of the amine having a labile chlorine atom.

EXAMPLE NO. 15

*Resin modified to contain* O—CH$_2$—CH$_2$—COOH *groups.*—1000 grams phenol (melting point 40.6° C.) plus 2000 grams 37.1% formaldehyde (containing 1% methanol) and 200 grams of 25% sodium hydroxide were allowed to react at 70° C. for 30 minutes and then 72 grams of B-propiolactone were added and the reaction mixture was allowed to stand at 40° C. for 1½ hours. The reaction mixture was then cooled to 35° C. or lower and allowed to percolate through a column of Nalcite HCR ion exchange resin in the hydrogen form until the pH of the effluent was below 3.5 (ash not over .02%). Trimethylamine was added until the pH was 4.6 to 5.4 and the solution was concentrated by vacuum dehydration to contain 60% solids. This resin contained O—CH₂—CH₂—COOH groups which were converted to the amine salt after the sodium hydroxide had been eliminated. This compound gives internal plasticizing action and makes a resin which appears to be capable of reacting with the glass surface when used for bonding glass fibers.

EXAMPLE NO. 16

*Resin using triethanolamine.*—The procedure of Example 15 was followed except that the amine used was triethanolamine and the pH before dehydration was adjusted to fall within the range of 7.1 to 7.7.

EXAMPLE NO. 17

*Resin containing —SO₃H groups.*—1000 grams phenol (melting point =40.6° C.), 2200 grams 37.1% formaldehyde (containing 1% methanol) and 240 grams of 25% sodium hydroxide were mixed thoroughly and then 30 grams of 66% phenolsulfonic acid were added. The mixture was allowed to react at 70° C. for 95 minutes and cooled to about 40° C. and then contacted with Nalcite HCR resin in the hydrogen form until the pH of the effluent dropped to about 2.5. The effluent was then neutralized to a pH of between 4.8 and 7.7 with triethanolamine and concentrated to 60% solids by vacuum dehydration. In making this resin there was initially formed sodium sulfonic acid but substantially all the sodium was removed by the ion exchange unit and subsequently the amine salt was formed.

EXAMPLE NO. 18

*Resin containing nuclear —COOH groups.*—The procedure followed was the same as in Example 17 except that a like molar quantity of B-resorcylic acid was employed as a substitute for the phenol sulfonic acid. This resin contained nuclear —COOH groups and was also capable of reacting with the free alkali of the glass.

EXAMPLE NO. 19

*Resin using salicylic acid.*—The procedure of Example 17 was followed except that salicylic acid was used instead of the phenol sulfonic acid. Here again a product was obtained capable of reacting with glass fibers.

EXAMPLE NO. 20

*Resin containing epoxy groups.*—1000 grams of phenol (melting point=40.6° C.) and 1932 grams 37.1% formaldehyde (containing 1% methanol) and 200 grams of 25% sodium hydroxide were mixed thoroughly. The solution was allowed to react at 70° C. for 30 minutes and then 30 grams of epichlorohydrin were added and the reaction was carried out at 70° C. for an additional 1½ hours. The reaction mixture was cooled to 40° C. or lower and percolated through a column of Nalcite HCR in the hydrogen form until the pH of the effluent dropped below 3.0. Triethanolamine was added to adjust the pH to between 4.8 and 5.4 and the solution was concentrated to a solids content of 70% solids by vacuum dehydration. This resin contained epoxy groups and when used as a bonding resin was characterized by its good strength.

It will be understood that it is intended to cover all changes and modifications of the examples of the invention herein chosen for the purpose of illustration which do not constitute departures from the spirit and scope of the invention.

The term "phenol-formaldehyde resin" as used herein is inclusive of phenol-formaldehyde resins containing modifying components and groups such as nuclear SO₃H and COOH groups, OCH₂CH₂COOH groups, amine salts, epoxy groups, and the like.

This application is a continuation-in-part of our earlier application, Serial No. 487,454, filed February 10, 1955, and also of our earlier application Serial No. 465,724, filed October 29, 1954 which was a continuation-in-part of our earlier application Serial No. 385,268, filed October 9, 1953, all now abandoned.

What we claim is:

1. The process of producing an aqueous resin solution of a phenol-formaldehyde resin of the type catalyzed with a metal alkali, which solution is characterized by the fact that it is substantially free of metal alkali salts of an acid other than phenol but has a pH of between 4 and 8 and an ash content of not over 0.9%, which comprises reacting 1 mol of phenol with 1.5–3.2 mols of formaldehyde in the presence of a soluble metal alkali to produce a water soluble resin, passing the resulting alkaline solution of the water soluble resin through a mass of cation exchanger that is adjusted to the acid cycle and is insoluble in the said solution, continuing such cation exchange treatment until the pH of the solution is below 8 and adjusting the pH of the solution to between 4 and 8 by adding an alkali selected from the group consisting of the soluble metal alkalies, ammonia and amines, in such amount if any required to give a pH of between 4 and 8.

2. A process as specified in claim 1 in which the cation exchange treatment is stopped while the pH of the solution is between 4 and 8 so that no addition of alkali is necessary.

3. A water solution of a phenol-formaldehyde resin prepared by the process of claim 1, said solution being characterized by the fact that it has a water tolerance of at least an equal volume of water to a given volume of 35% solution of the resin and characterized by the fact that it will have a viscosity of not over 3.5 poises for a solution containing 70% solids.

4. A process as specified in claim 1 in which the cation exchange treatment is continued until substantially all of the alkali metal is removed, after which the pH of the solution is adjusted within the range of 4 to 8 by the addition of sufficient nitrogen-containing base.

5. A process in accordance with claim 4 in which the nitrogen-containing base is an aliphatic amine and an acid is added in addition to the nitrogen-containing base, thereby forming the amine salt.

6. A water solution of a phenol-formaldehyde resin prepared by the process of claim 5, said solution being characterized by the fact that it has a water tolerance of at least an equal volume of water to a given volume of 35% solution of the resin and characterized by the fact that it will have a viscosity of not over 3.5 poises for a solution containing 70% solids.

7. The process of producing an aqueous resin solution of a phenol-formaldehyde resin of the type catalyzed with a metal alkali, which solution is characterized by the fact that it is substantially free of metal alkali salts of an acid other than phenol but has a pH of between 4.8 and 7.8 and an ash content of between .05% and .9% which comprises reacting 1 mol of phenol with 2–3.2 mols of formaldehyde in the presence of a soluble metal alkali, passing the resulting alkali solution of the water soluble condensation product through a mass of cation exchanger that is adjusted to the acid cycle and is insoluble in the said solution, continuing such cation exchange treatment until the pH of the solution is below 7.8 and adjusting the pH of the solution to between 4.8 and 7.8 by adding soluble metal alkali in such amount if any required to give a pH of between 4.8 and 7.8.

8. A process as specified in claim 7 in which the pH of the solution is adjusted by blending together a plurality of portions of resin solution having different pH values so that the pH of the blended mass is between 4.8 and 7.8.

9. The process of producing an aqueous resin solution of a phenol-formaldehyde resin having the characteristics of a resin catalyzed by a metal alkali, which solution is characterized by the fact that it is substantially free of metal alkali compounds and has an ash content of not over .02% but has a pH of between 4 and 8 which comprises reacting one mol of phenol with 1.7–3.2 mols of formaldehyde in the presence of a soluble metal alkali to produce a water soluble resin, treating the resulting alkaline solution of the water soluble resin with a cation exchanger that is adjusted to the acid cycle and is insoluble in the said solution, continuing such cation exchange treatment until substantially all of the alkali metal is removed and the pH of the solution falls below 3 and the ash falls to below .02%, and adjusting the pH of the solution to between 4 and 8 by adding sufficient nitrogen-containing base to give a pH of between 4 and 8.

10. The process as specified in claim 9 in which the base used for the adjustment is ammonia.

11. The process as specified in claim 9 in which the base used for the adjustment is an amine.

12. A process as specified in claim 9 in which the phenol and formaldehyde are reacted to the point where the resin solution contains not over 8% free formaldehyde.

References Cited in the file of this patent
UNITED STATES PATENTS

| | | |
|---|---|---|
| 2,580,325 | Scott et al. | Dec. 25, 1951 |
| 2,617,800 | Bergman | Nov. 11, 1952 |
| 2,758,101 | Sappell | Aug. 7, 1956 |